United States Patent [19]

Rogakos

[11] 3,757,472
[45] Sept. 11, 1973

[54] SYSTEM INCLUDING BI-DIRECTIONAL DRIVE MECHANISM WITH REVERSE DRIVE LIMIT

[75] Inventor: Deno J. Rogakos, Kettering, Ohio

[73] Assignee: General Motors Corporation, Detroit, Mich.

[22] Filed: July 21, 1971

[21] Appl. No.: 164,711

[52] U.S. Cl.......................... 49/40, 49/139, 49/349, 192/8 R
[51] Int. Cl.............................................. E05f 15/12
[58] Field of Search...................... 49/139, 140, 349, 49/40; 192/8 R, 8 C, 12 BA, 14, 41 S, 43, 81 C

[56] References Cited
UNITED STATES PATENTS
3,024,884  3/1962  Sieber................................ 192/8 R
3,559,232  2/1971  Crane.......................... 192/12 BA X Primary Examiner—J. Karl Bell
Attorney—J. L. Carpenter and F. J. Fodale

[57] ABSTRACT

A stationwagon vehicle body has a tailgate movable in an arcuate path between a lowered open position and a raised closed position. The tailgate is power actuated through a bi-directional drive mechanism which allows manual closing of the tailgate but prevents its manual opening.

4 Claims, 7 Drawing Figures

INVENTOR.
Deno J. Rogakos
BY
F. J. Fodale
ATTORNEY

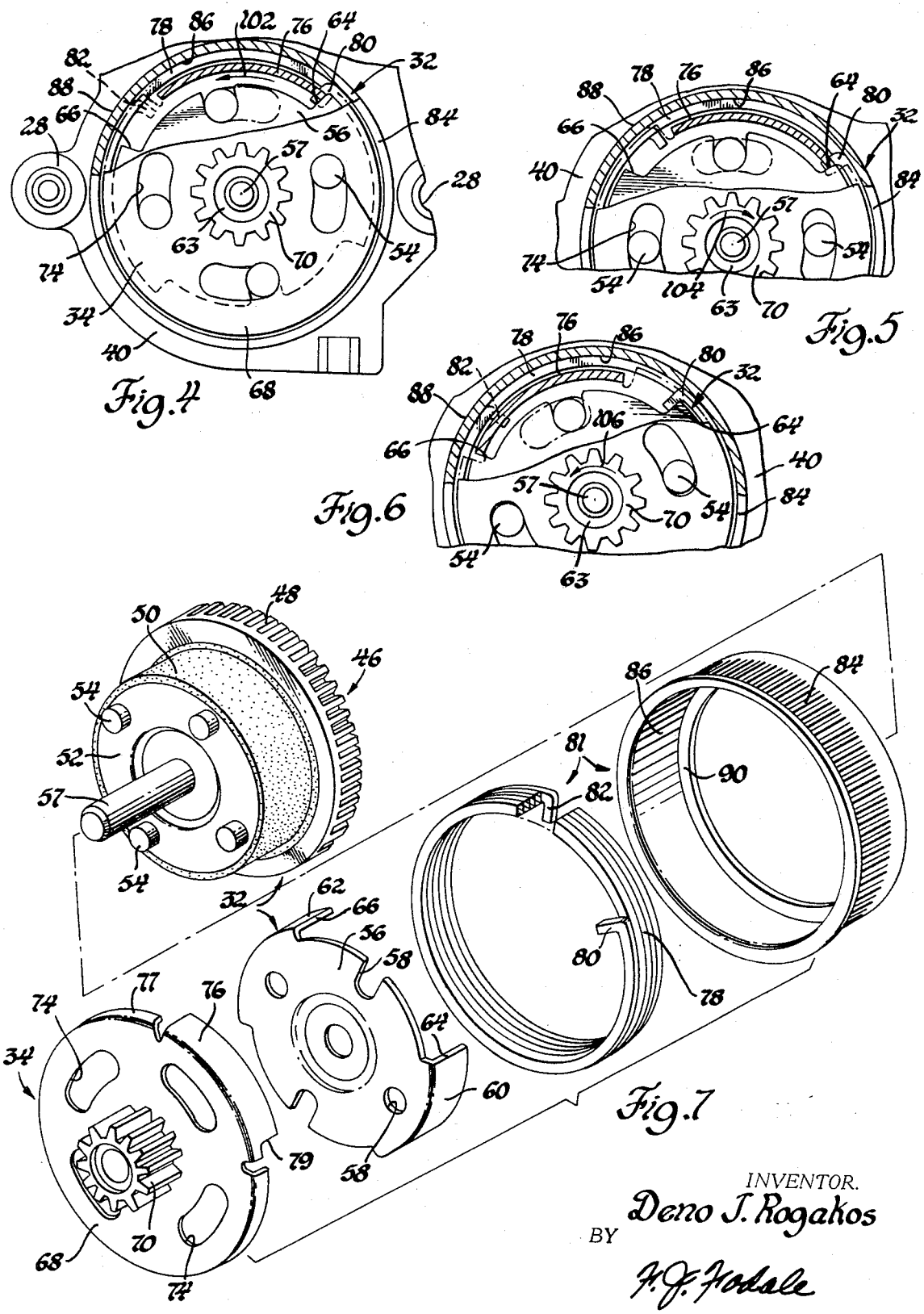

SYSTEM INCLUDING BI-DIRECTIONAL DRIVE MECHANISM WITH REVERSE DRIVE LIMIT

This invention is directed to a system including a drive mechanism for a vehicle body tailgate, or the like, which permits raising and lowering of the tailgate from an operator and the manual raising of the tailgate, but prevents lowering of the tailgate other than by the operator and to the drive mechanism per se.

More specifically, the invention results from problems associated with a vehicle body of the closed stationwagon type in which the tailgate swings in an arcuate path from a raised generally vertical position which provides a closed vehicle body to a lowered generally horizontal position under a rear portion of the load floor providing access to the load floor.

In attempting to design a power actuation system for opening and closing the tailgate, it was found that a desirable feature of the power actuation system was to provide for manual lifting of the tailgate should the system become inoperative so that the vehicle purchaser would be able to close the body until the system was repaired. The manual lifting of the tailgate is the most convenient precaution because the power actuator system is generally not readily accessible.

Another desirable feature closely associated with the first feature is provision for locking the tailgate against being pushed down or falling under its own weight to prevent the tailgate from being opened when the vehicle is unattended, or from falling down from an intermediate position should the power actuation system become inoperative while raising or lowering the tailgate. Since a power actuation system, or a manual one for that matter, generally involves a bi-directional input drive for raising and lowering the tailgate, another feature of this system is that it involves a bi-directional drive.

In one of its broadest aspects, it is the object of this invention to provide a compact, easily assembled, simple, efficient and inexpensive bi-directional drive mechanism which allows reverse drive in one direction but prevents it in the other.

In another of its broadest aspects, the object of this invention is to provide a system incorporating such a drive mechanism for raising and lowering a tailgate, or the like, from an actuator in which the tailgate itself may be moved in one direction but not the other upon disconnection of the input by the actuator.

These broad objects, as well as their specifics, and other features of the invention will become more apparent by reference to the following detailed description and annexed drawings of a specific embodiment of this invention in which:

FIG. 2 shows various parts of the drive mechanism in a first operative position for lowering the vehicle body tailgate.

FIG. 4 is a view similar to FIG. 2 showing various parts of the drive mechanism in another operative position for raising the vehicle tailgate.

FIG. 5 is a view similar to FIG. 2 showing various parts of the drive mechanism in still another operative position for preventing manual lowering of the tailgate.

FIG. 6 is a view similar to FIG. 2 showing various parts of the drive mechanism in yet still another operative position to permit manual raising of the tailgate.

FIG. 7 is an exploded perspective view of various internal parts of the drive mechanism.

Figure 1:
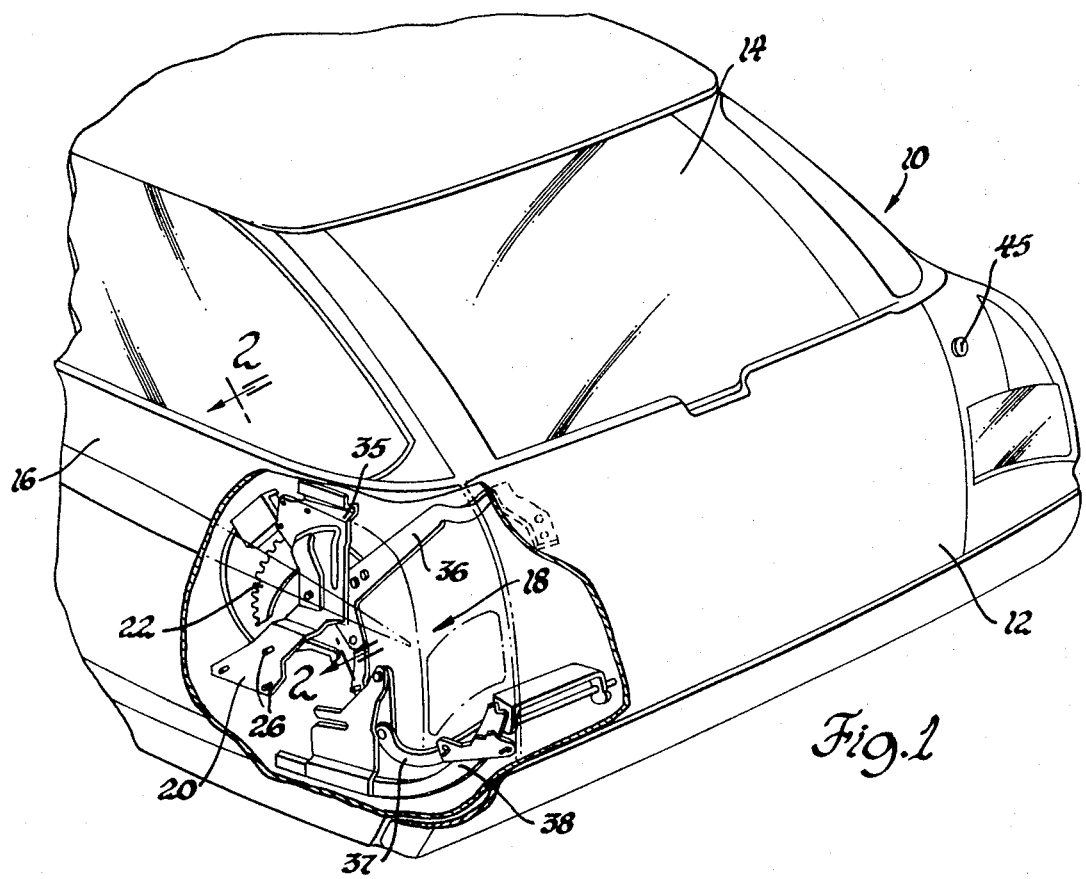
FIG. 1 is a perspective view of the rear portion of a stationwagon vehicle body with a section of the body broken away and the actuator assembly removed for clarity.

Referring now to the drawings and more specifically to FIG. 1, a stationwagon vehicle body indicated generally at 10 is provided with a tailgate 12 which is movable in an arcuate path between a raised generally vertical position and a lowered generally horizontal position in a storage well beneath the rear portion of the load floor (not shown). The tailgate 12 moves independently of the rear window 14, however, the movement of the two is coordinated so that the entire rear area may be opened to provide access to the load floor or closed to provide a closed vehicle body. The left-hand rear quarter panel 16 of the vehicle body is broken away to illustrate a linkage system indicated generally at 18 having a control arm 36 attached to the upper portion of the tailgate 12 and an idler arm 37 attached to the lower portion of the tailgate 12. The control arm 36 pivots on support plate 35 and the idler arm 37 follows the channel guide 38 to raise and lower the tailgate. The specific mechanism is disclosed in Patent application Ser. No. 72,750 filed on Sept. 16, 1970, and reference should be had thereto for a more detailed description of the linkage system and its operation. For a complete understanding of this invention, it is sufficient to note that the tailgate 12 is raised and lowered by relative movement between the bracket 20 on the support plate 38 and the sector gear 22 attached to the control arm 36. Such movement is provided by an actuator assembly 24 shown in FIG. 2. The actuator assembly 24 has been omitted from FIG. 1 for clarity, however, when assembled to the vehicle body 10, the actuator assembly is mounted on the bracket 20 by the three studs 26 which are received in three mounting holes 28 in the housing 40. The actuator assembly 24 has an output member 34 with a pinion gear which meshes with the sector gear 22 so that rotation of the output member 34 pivots the control arm 36 with respect to support plate 35. Journaled in the upper portion of the housing 40 is a worm gear 42 connected to a reversible electric motor 44 which meshes with a gear on an input member 32. The electric motor 44 is controlled by a key switch 45 in the rear of the vehicle body and may also be controlled from another switch located in the vehicle body interior. The electrical connection for the switches 45 and motor have been omitted since the important feature relative to this invention lies in the fact that the input member 32 is driven in one direction to lower the tailgate 12 and in the other direction to raise the tailgate 12. The input member 32 may be motor driven by a bi-directional motor, such as reversible electric motor 44, or it may be manually driven for instance by a crank and a suitable drive train between the inaccessible input and a crank which is conveniently located on the vehicle body.

Figure 3:
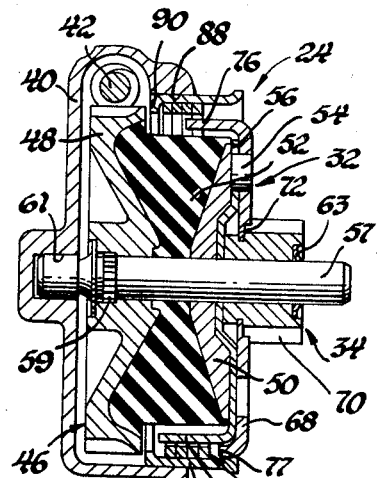
FIG. 3 is a section taken substantially along the line 3—3 of FIG. 2.

Referring now to FIG. 3, it is seen that the input member 32 includes a composite spur gear 46 and a cut-like stamping 56 journaled in the housing 40 such that the teeth of the spur gear mesh with the worm gear 42 as mentioned heretofore. The composite spur gear 46 comprises a cast metal toothed element 48, a second cast metal element 50 and a rubber annulus 52 bonded therebetween, and as such is relatively inexpensive to manufacture.

Figure 2:
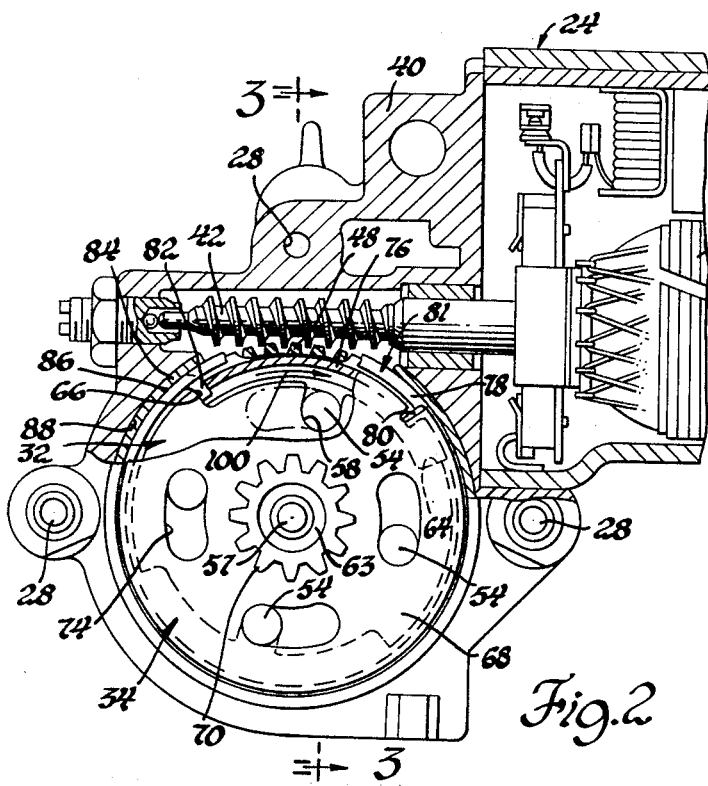
FIG. 2 shows a plan view of the actuator assembly including a bi-directional drive mechanism as it would be seen from a view taken along the line 2—2 of FIG. 1 had the actuator assembly not been removed from FIG. 1.

As best understood in conjunction with FIGS. 2, 3 and 7, the cast metal element 50 of the composite spur gear 46 includes four circumferentially spaced integral pins 54 pressed into the holes 58 in the cup-like stamping 56. The composite spur gear 46 in turn is splined to a shaft 57 at 59 to complete the input member subassembly 32. The stamping 56 includes a pair of generally axial integral flanges 60 and 62 which provide a first drive shoulder 64 and a second drive shoulder 66 respectively on opposite sides of a reduced diameter portion.

The output member 34 which is journaled on the shaft 57 comprises a stamped cup disc 68 with a pinion gear 70 secured to it at 72. The stamped cup disc 68 has four circumferentially spaced arcuate slots 74 which receive the pins 54 while allowing relative rotation between the stamping 56 and the disc 68. The disc 68 has a short circumferential wall 77 and an integral general axial tongue 76. The tongue 76 is at substantially the same radial distance from the center of the disc 68 as are the flanges 60 and 62 from the center of the cup-like stamping 56 while the wall 77 is located on a larger diameter. Thus, the cup-like stamping 56 is nestable within the short circumferential wall 77 of the stamped cup disc 68 with the tongue 76 thereon receivable between the flanges 60 and 62. The nestability feature provides for a compact unit and the use of stamped parts contributes to lower costs. The circumferential dimension of the tongue 76 is less than the circumferential distance between the drive shoulder 64 and the drive shoulder 66 so that there is a lost motion driving connection between the spur gear 46 and the pinion gear 70. It is also to be noted that the axial dimension of the tongue 76 is less than that of the flanges 60 and 62, and that the face of the tongue confronting the drive shoulder 64 has an undercut 79. The reason for these structural features will become more apparent hereafter.

The drive mechanism, in addition to the input and output subassemblies, also includes a spring brake or clutch 81 comprising a coil spring 78 having a first integral tab 80 at one end and a second integral tab 82 at the opposite end. An insert 84 provides an internal peripheral surface 86 having a diameter which is less than the free outside diameter of the coil spring 78 so that when the coil spring 78 is inserted into the insert 84 it tries to unwind and tightly engages the internal peripheral surface 86. The coil spring 78 is wound such that a counter-clockwise torque on the tab 80, or a clockwise torque on the tab 82, further winds up the spring and releases it from the surface 86. Opposite torques on each of the tabs aid in the unwinding of the spring and tightens its engagement with surface 86. The outer surface of the insert 84 is preferably slightly serrated to prevent creep after the insert is press fitted into an interior cylindrical surface 88 on the housing 40.

The parts of the drive mechanism shown in FIG. 7 are specifically designed for ease of assembly which occurs in the following manner. The input member 32 comprising a subassembly of the composite spur gear 46 and the cup-like stamping 56 is first journaled in the housing 40 by inserting the end of the shaft 57 into the journal 61. See FIG. 3. Next the spring clutch 81 comprising the insert 84 and the coil spring 78 is inserted into the housing 40 so that the tabs 80 and 82 confront the driving shoulders 64 and 66 respectively. The insertion of the spring clutch 81 is possible because the short radial flange 90 on the backside of the insert 84 has an inner diameter greater than the maximum diameter of the stamping 56 which occurs at flanges 60 and 62. The flange 90, however, is not larger than the toothed member 48 so that the insert 84 serves to prevent egress of the input member 32. The output member comprising pinion gear 70 and stamped cup disc 68 is then journaled on the shaft 57 with the tongue 76 oriented to fit between the drive shoulders 64 and 66, and more specifically, such that the tab 80 is located between the drive shoulder 64 and the undercut 79 in the face of the tongue 76. As brought out heretofore, the tongue 76 is shorter than the flanges 60 and 62, and thus, it does not project beyond the tab 82 at the inside end of the insert. The tongue 76 being at the same radial distance as the flanges 60 and 62, all of which are spaced inwardly from the coil spring 78, permits drive between the input and output members except for the limitation imposed by the tabs 80 and 82 which are described below in the operation of the drive mechanism. It is also to be noted that the short flange 77 is at approximately the same radial distance as the coil spring 78 to prevent its egress from the insert 88 when free from the peripheral surface 86. The output member 34 is held in position by a retainer 63 pushed onto the end of the shaft 57. Thus it is seen that the drive mechanism comprises a minimum number of parts which are assembled in a simple and efficient manner.

The drive mechanism is shown in various modes of operation in FIGS. 2, 4, 5 and 6. In order to lower the tailgate 12 from its raised position as seen in FIG. 1 to a lowered open position where the tailgate is stored in the well beneath the load floor of the vehicle, the motor 44 is activated rotating the spur gear 46 and cup-like stamping 56 in the clockwise direction as indicated by the arrow 100 in FIG. 2. Previous to the position shown in FIG. 2, the cup-like stamping 56 was rotated clockwise until the driving shoulder 66 engaged the tongue 76 on the stamped cup disc 68 to take up the lost motion therebetween. During the lost motion rotation, the tab 82 was engaged by drive shoulder 66 and rotated clockwise slightly decreasing the outer diameter of the coil spring 78 and disengaging it from the internal peripheral surface 86 on the insert 84. In the condition shown in FIG. 2, clockwise rotation of the spur gear 48 drives the pinion gear 70 clockwise which in turn causes the required relative movement between the sector gear 22 and the bracket 20 to pivot the tailgate to a lowered open position.

Raising the tailgate 12 to a closed position is done by actuating the electric motor 44 for rotation in the opposite direction which drives the spur gear 46 counter-clockwise as indicated by the arrow 102 in FIG. 4. In rotating counter-clockwise from the position shown in FIG. 2 to that shown in FIG. 4, the driving shoulder 64 on the cup-like stamping 56 first engages the tab 80 imparting a slight counter-clockwise rotation thereto which disengages the coil spring 78 from the internal surface 86 on the insert 84. The coil spring 78 being disengaged, it rotates with the stamping 56 until the drive shoulder 46 engages the tongue 76 with the tab 80 disposed therebetween in the space provided by the undercut 92 in the tongue 76. In the condition shown in FIG. 4, the lost motion of the drive connection has been taken up so that the spur gear 46 drives the pinion gear 70 counter-clockwise which in turn causes the required relative movement between the bracket 20 and the sector gear 22 to raise the tailgate to the position shown in FIG. 1.

Should for any reason the motive source such as electric motor 44, or its drive train including the input member 32 become inoperative, the tailgate 12 is held in any position by the output member 34 cooperating with the spring clutch 81. The tailgate 12 cannot be pushed down, i.e. lowered manually or fall under its own weight. However, it may be lifted to the closed position to provide a closed vehicle body until the motive source or drive train is repaired.

The manner in which lowering of the tailgate manually, or by its own weight by the spring clutch 81 and output member 32 is prevented, is shown in FIG. 5. Lowering of the tailgate 12 produces a clockwise rotation of the pinion gear 70 as indicated by the arrow 104. This action may allow a slight clockwise rotation until the undercut 92 on the tongue 76 engages the tab 80. Further clockwise rotation of the output member 34, however, is prevented by the tab 80, and in fact, the clockwise torque thereon further tightens the coil spring 78 against the internal surface 86 on the insert 84.

On the other hand, manual raising of the tailgate 12 is permitted because of the shortened axial dimension of the tongue 76 which does not extend to the tab 82. The manual raising of the tailgate rotates the pinion gear counter-clockwise as indicated by the arrow 106 in FIG. 6 until the tongue 76 on the stamping disc 68 engages the drive shoulder 66 on the cup-like stamping 56. It is to be noted that the tab 82 is out of the path of rotation of the tongue 76 in this direction so that the counter-clockwise rotation is not prevented by the spring clutch 81. The stamping 56 is driven counter-clockwise by the disc 68 until the other drive shoulder 64 on the stamping 56 engages the tab 80 to disengage the spring 78 from the insert 84 and thus allowing continued rotation of the pinion gear 70 until the tailgate is completely raised to a closed position.

Thus, I have provided a simple drive mechanism with a minimum number of parts, and yet, provides the required four modes of operation, that is, forward drive in both directions, reverse drive in one direction and reverse braking in the other direction. The mechanism is compact and capable of being mounted in a vehicle body hidden from view, and as such is well suited for the tailgate actuation system in which it operates.

I wish it to be understood that I do not desire to be limited to the exact details of construction shown and described, for obvious modifications will occur to a person skilled in the art.

I claim:

1. In combination a reversible operator, a closure and a linkage system operatively interposed therebetween for moving the closure between a lower position and a raised position by the operator, an input member drivingly connected to said operator, an output member drivingly connected to said linkage system, a lost motion driving connection between said input member and said output member, a first limit stop in the path of movement of said input member in one direction and in the path of movement of said output member in the opposite direction, a second limit stop in the path of movement of said input member in said opposite direction and out of the path of movement of said output member in said one direction, braking means normally holding said spaced limit stops in a fixed position, means including said limit stops respectively disengaging said brake means in response to movement in either direction by said input member whereby said input member drives the output member in said one direction to raise said closure and in said opposite direction to lower said closure in response to said operator, and further means including said first stop disengaging said brake means in response to movement in said one direction by said output member whereby said closure may be raised manually but is prevented from being lowered manually or under its own weight.

2. In a vehicle body having a reversible operator, a tailgate and a linkage system operatively interposed therebetween for moving the tailgate between a lower open position and a raised closed position by the reversible operator, a bi-directional drive mechanism comprising, a housing secured to said vehicle body, an input member journaled in said housing and drivingly connected to said operator, an output member journaled in said housing and drivingly connected to said linkage system, a lost motion driving connection between said input member and said output member, a coil spring tightly engaging a peripheral surface on said housing, a first tab at one end of said spring, said first tab being in the path of rotation of said input member in one direction and in the path of rotation of said output member in the opposite direction, said input member when rotated by said operator in said one direction engaging and moving said first tab in a direction which releases said coil spring from tight engagement with said peripheral surface and driving said output member in said one direction through said lost motion driving connection to raise said tailgate, said output member engaging said first tab and further tightening said coil springs on said peripheral surface in response to rotation by said linkage system in said opposite direction to prevent the manual lowering of said tailgate, a second tab at the opposite end of said spring, said second tab being in the path of rotation of said input member in said opposite direction and out of the path of rotation of said output member in said one direction, said input member when rotated by said operator in said opposite direction engaging and moving said tab in a direction which releases said coil spring from tight engagement with said peripheral surface and driving said output member in said opposite direction through said lost motion connection to lower said tailgate, and said output member engaging said input member in response to rotation by said linkage system in said one direction and driving said input member in said one direction through said lost motion connection thereby releasing said coil spring from tight engagement with said peripheral surface thereby permitting the manual raising of said tailgate.

3. A bi-directional drive mechanism comprising:
a housing having an input member and an output member substantially coaxially journaled therein,
a pair of circumferentially spaced driving shoulders on said input member,
a generally axial tongue on said output member, said tongue being disposed between said driving shoulders and having a circumferential dimension less than the spacing between said driving shoulders whereby there is provided a lost motion driving connection between said input and output members in either direction of rotation,
a coil spring tightly engaging a peripheral surface on said housing, and
first and second generally radial tabs on said coil spring adjacent the ends thereof respectively,
said first tab being disposed between one of said driving shoulders and said tongue, said input member when rotated in one direction engaging said first tab and moving said first tab in a direction which releases said spring from tight engagement with said peripheral surface and driving said output member in said one direction through said tongue, said output member when rotated in an opposite direction engaging said first tab and further tightening the engagement of said coil spring with said peripheral surface and preventing the driving of said input member by said output member in said opposite direction,
said second tab confronting said other driving shoulder and located out of the path of movement of said tongue, said input member when rotated in said opposite direction engaging said second tab and moving said second tab in a direction which releases said coil spring from tight engagement with said peripheral surfaces and driving said output member in said opposite direction through said tongue, said output member when rotated in said one direction engaging said other shoulder and driving said input member in said one direction, said input member engaging said first tab and moving it in a direction releasing said coil spring from tight engagement with said peripheral surface.

4. A bi-directional drive mechanism with a one-way reverse lock comprising in combination,
a housing having a composite input gear including an annular rubber like element and an output gear substantially coaxially journaled therein,
a cup-like stamping non-rotatably secured to said input gear,
a pair of circumferentially spaced flanges on said cup-like stamping extending generally axially into the interior of said housing,
a stamped cup disc non-rotatably secured to said output gear,
a short circumferential wall on said stamped cup disc at a greater radial distance than said flanges,
a tongue extending generally axially from said stamped cup disc at substantially the same radial distance as said flanges, said cup like stamping being nested in said circumferential wall of said stamped cup disc with said flanges thereon being on opposite sides of said tongue, said tongue having a circumferential dimension less than the spacing between said flanges whereby there is provided a lost motion driving connection between said composite input gear and said output gear,
an insert having a minimum diameter greater than the maximum diameter of said cup-like stamping pressed into said housing concentric with said gears,
a coil spring located radially outwardly of said flanges and tongue and tightly engaging an internal peripheral surface on said insert, and
first and second generally radial tabs on said coil spring adjacent the ends thereof respectively,
said first tab extending radially inwardly between one of said flanges and said tongue, said one flange engaging said first tab and said tongue when said input gear is rotated in one direction releasing said coil spring from tight engagement with said peripheral surface and driving said output gear in said one direction, said tongue engaging said first tab and further tightening the engagement of said coil spring with said peripheral surface in response to rotation of said output gear in the opposite direction thereby preventing said output gear from driving said input gear in the opposite direction,
said second tab confronting said other flange and located out of the path of rotation of said tongue, said other flange engaging said second tab and said tongue when said input gear is rotated in said opposite direction releasing said coil spring from tight engagement with said peripheral surface and driving said output gear in said opposite direction, said tongue engaging said other flange when said output gear is rotated in said one direction and driving said input gear in said one direction with said one flange engaging said first tab and releasing said coil spring from tight engagement with said peripheral surface.

* * * * *

PO-1050
(5/69)

UNITED STATES PATENT OFFICE
CERTIFICATE OF CORRECTION

Patent No. 3,757,472            Dated September 11, 1973

Inventor(s) Deno J. Rogakos

It is certified that error appears in the above-identified patent and that said Letters Patent are hereby corrected as shown below:

In the Specification, Column 4, line 67, "drive shoulder 46" should read -- drive shoulder 64 --.

In the Claims, Column 6, line 11, before "braking means" insert -- two-way --.

Signed and sealed this 25th day of December 1973.

(SEAL)
Attest:

EDWARD M. FLETCHER, JR.       RENE D. TEGTMEYER
Attesting Officer               Acting Commissioner of Patents